United States Patent
Song et al.

(10) Patent No.: US 12,451,293 B2
(45) Date of Patent: Oct. 21, 2025

(54) ELECTRONIC COMPONENT

(71) Applicant: SAMSUNG ELECTRO-MECHANICS CO., LTD., Suwon-si (KR)

(72) Inventors: Gyeong Ju Song, Suwon-si (KR); Beomjoon Cho, Suwon-si (KR); Younghun Lee, Suwon-si (KR); Jihong Jo, Suwon-si (KR); Seungmin Ahn, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 285 days.

(21) Appl. No.: 17/975,828

(22) Filed: Oct. 28, 2022

(65) Prior Publication Data

US 2023/0178304 A1 Jun. 8, 2023

(30) Foreign Application Priority Data

Dec. 2, 2021 (KR) .................... 10-2021-0170737

(51) Int. Cl.
*H01G 4/30* (2006.01)
*H01G 2/06* (2006.01)
*H01G 4/228* (2006.01)
*H01G 4/232* (2006.01)

(52) U.S. Cl.
CPC ............ *H01G 4/30* (2013.01); *H01G 2/06* (2013.01); *H01G 4/228* (2013.01); *H01G 4/232* (2013.01)

(58) Field of Classification Search
CPC ............ H01G 2/06; H01G 4/30; H01G 4/232
See application file for complete search history.

(56) References Cited

U.S. PATENT DOCUMENTS

| 11,887,787 B2 * | 1/2024 | Miyauchi | H01G 4/40 |
| 2009/0296311 A1 * | 12/2009 | Otsuka | H01G 4/2325 361/306.3 |
| 2015/0296623 A1 * | 10/2015 | Trinh | H01L 23/498 228/203 |
| 2020/0194175 A1 | 6/2020 | Cho et al. | |

(Continued)

FOREIGN PATENT DOCUMENTS

| CN | 111715989 A | 9/2020 | |
| CN | 112735821 A * | 4/2021 | H01G 2/06 |

(Continued)

OTHER PUBLICATIONS

Korean Office Action dated Jan. 23, 2025 issued in Korean Patent Application No. 10-2021-0170737 (with English translation).

(Continued)

*Primary Examiner* — David M Sinclair
(74) *Attorney, Agent, or Firm* — Morgan Lewis & Bockius LLP

(57) ABSTRACT

An electronic component includes a multilayer capacitor including a capacitor body including a dielectric layer and an internal electrode, and an external electrode disposed on one surface of the capacitor body, a frame terminal disposed on the external electrode, and a conductive bonding portion disposed between the external electrode and the frame terminal. The frame terminal has a groove portion extending along an outer periphery of an area in contact with the conductive bonding portion.

19 Claims, 8 Drawing Sheets

(56) References Cited

U.S. PATENT DOCUMENTS

| | | | |
|---|---|---|---|
| 2021/0125781 A1* | 4/2021 | Masuda | H01G 2/06 |
| 2021/0125782 A1* | 4/2021 | Masuda | H01G 2/06 |
| 2022/0020533 A1* | 1/2022 | Iguchi | H01G 2/065 |

FOREIGN PATENT DOCUMENTS

| | | | | |
|---|---|---|---|---|
| CN | 112735822 A | * | 4/2021 | H01G 2/06 |
| CN | 114464452 A | * | 5/2022 | H01G 2/06 |
| JP | 2000340446 A | * | 12/2000 | |
| JP | 2003-100983 A | | 4/2003 | |
| JP | 2020-064982 A | | 4/2020 | |
| KR | 10-1774463 B1 | | 9/2017 | |
| KR | 10-2019-0121232 A | | 10/2019 | |

OTHER PUBLICATIONS

Korean Notice of Final Rejection dated Sep. 12, 2025 issued in Korean Patent Application No. 10-2021-0170737 (with English translation).

* cited by examiner

ELECTRONIC COMPONENT

CROSS-REFERENCE TO RELATED APPLICATION

This application claims priority to and the benefit of Korean Patent Application No. 10-2021-0170737 filed in the Korean Intellectual Property Office on Dec. 2, 2021, the entire contents of which are incorporated herein by reference.

TECHNICAL FIELD

The present disclosure relates to an electronic component, and more particularly, to a multilayer ceramic capacitor.

BACKGROUND

Electronic components may be down-sized and realize high capacity and thus are used in various electronic devices. Particularly, the electronic components are essentially used for the latest IT devices due to high frequency characteristics and excellent heat resistance.

Recently, with the rapid rise of environmentally-friendly and electric vehicles, as electric power driving systems in automobiles are increasing, the demand for the electronic components such as multilayer capacitors required for the automobiles is increasing.

Since automobile parts are required to have high heat resistance and electrical reliability, the electronic components are also required to have more advanced performance.

Accordingly, there is an increasing demand for electronic components capable of realizing high capacity in a limited space or having excellent durability against vibration and deformation. However, since the conventional electronic components are mounted directly on a board, heat or deformation generated from the board is directly transmitted to the electronic components, failing in securing reliability. Accordingly, a method of protecting the electronic components by bonding a metal frame at the sides thereof to secure a distance between electronic components and the board and thus absorb the heat or deformation by the metal is suggested.

However, as a flux component included in a solder used for bonding the metal frame with the electronic components may dissolve a glass component of the electronic components and thus make a moisture-penetrating path, there is a problem of deteriorating moisture resistance and insulation resistance and shortening a life-span of the components.

SUMMARY

An embodiment provides an electronic component with improved IR (insulation resistance) characteristics, which may contribute to stable circuit operation even when products are used under a higher voltage condition.

An electronic component according to the embodiment includes: a multilayer capacitor including a capacitor body including a dielectric layer and an internal electrode, and an external electrode disposed on one surface of the capacitor body; a frame terminal disposed an the external electrode; and a conductive bonding portion disposed between the external electrode and the frame terminal.

The frame terminal may have a groove portion extending along an outer periphery of the area in contact with the conductive bonding portion.

The groove portion may be disposed on a surface of the frame terminal facing the multilayer capacitor.

The groove portion may be disposed at a position including an upper side, a lower side, a left side, a right side, or a combination thereof of an area in contact with the conductive bonding portion.

The groove portion may include a first partial groove portion extending in a first direction, and a second partial groove portion extending in a second direction different from the first direction.

The groove portion may further include third and fourth partial groove portions, wherein the third partial groove portion may extend in the first direction and the fourth partial groove portion may extend in the second direction.

The groove portion may surround the outer periphery of the area in contact with the conductive bonding portion.

The groove portion may be disposed between the outer periphery of the area in contact with the conductive bonding portion and an edge of the frame terminal.

The groove may be spaced apart from an edge of the frame terminal.

The groove portion may have a closed circuit shape in which one end and the other end are connected to each other.

The groove portion may have a concave and long-grooved line shape.

Each length of the first and second partial groove portions may be greater than or equal to a length of one side of the corresponding external electrode, respectively.

An average width ratio of the groove portion may be less than or equal to about 50% relative to an average thickness of the frame terminal.

An average depth ratio of the groove portion may be less than or equal to about 50% relative to an average thickness of the frame terminal.

The frame terminal may include a base portion and a plating portion disposed on the surface of the base portion.

The groove portion may penetrate in the plating portion.

The plating portion may include Sn or an alloy including Sn as a main component.

The conductive bonding portion may include solder or a conductive resin paste.

An electronic component according to another embodiment includes: first and second multilayer capacitors each including a capacitor body including a dielectric layer and an internal electrode, and an external electrode disposed on one surface of the capacitor body; a frame terminal disposed on the external electrodes; and conductive bonding portions disposed between the external electrodes and the frame terminal.

The frame terminal may have groove portions extending along an outer periphery of each of areas in contact with the conductive bonding portions.

The groove portion may include a first partial groove portion extending in a first direction, and a second partial groove portion extending in a second direction different from the first direction.

The groove portion may further include third and fourth partial groove portions, wherein the third partial groove portion may extend in the first direction and the fourth partial groove portion may extend in the second direction.

Each of the grooves may surround the outer periphery of the area in contact with the conductive bonding portion.

The frame terminal may further include a fifth partial groove portion for connecting the groove portions to each other.

The fifth partial groove portion may extend, in a direction from the first multilayer capacitor to the second multilayer capacitor, on a surface of the frame terminal facing the first and second multilayer capacitors.

In the electronic component according to the embodiments, a multilayer capacitor is bonded to a metal frame to improve resistance to bending strength, deformation, acoustic noise, and the like and a flux component is prevented from penetrating toward an external electrode, a ceramic boundary, and a capacitor body, when the multilayer capacitor the metal frame are bonded by a solder, so that the electronic component may secure improved IR (insulation resistance) characteristics and thus contribute to stable circuit operation of a product even when the product is used under high voltage conditions.

DETAILED DESCRIPTION

Figure 1:
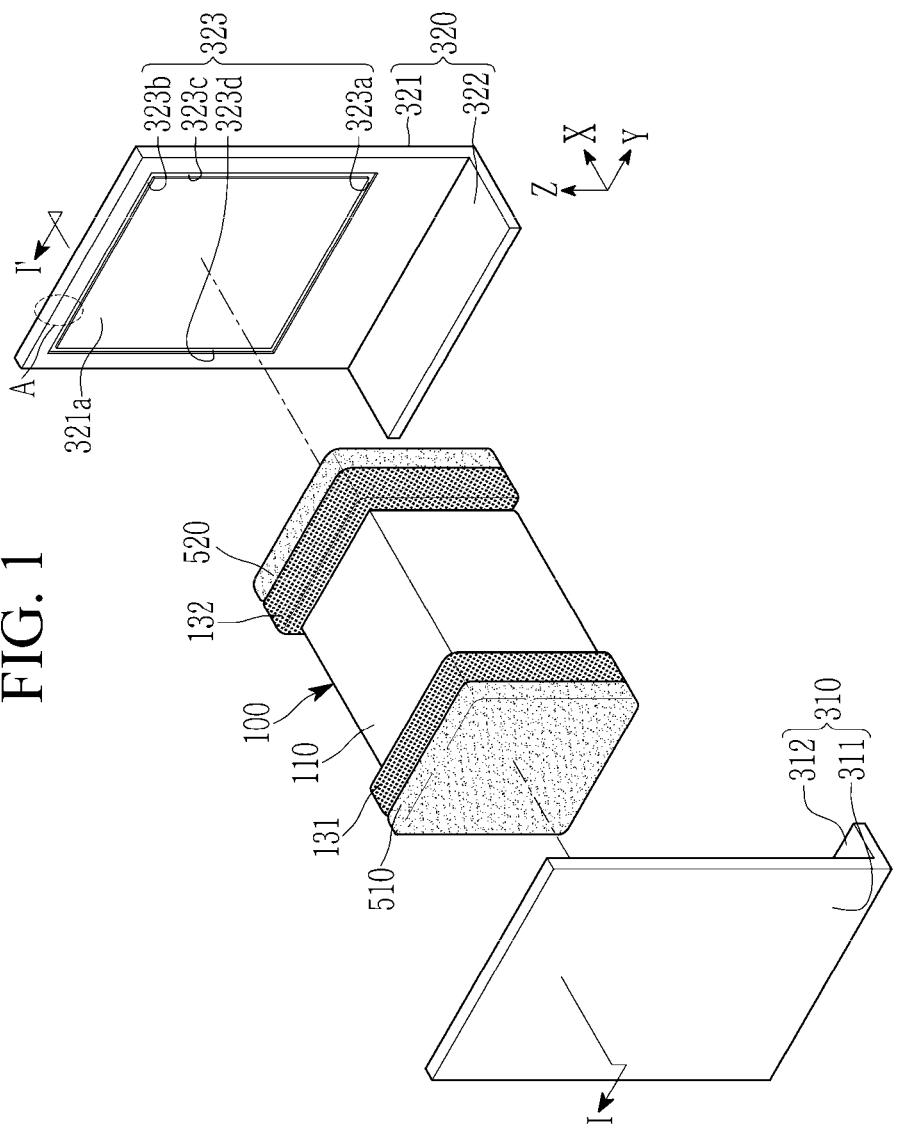
FIG. 1 is a partially exploded perspective view illustrating an electronic component according to an embodiment.

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include", "comprise", "have", or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Figure 2:
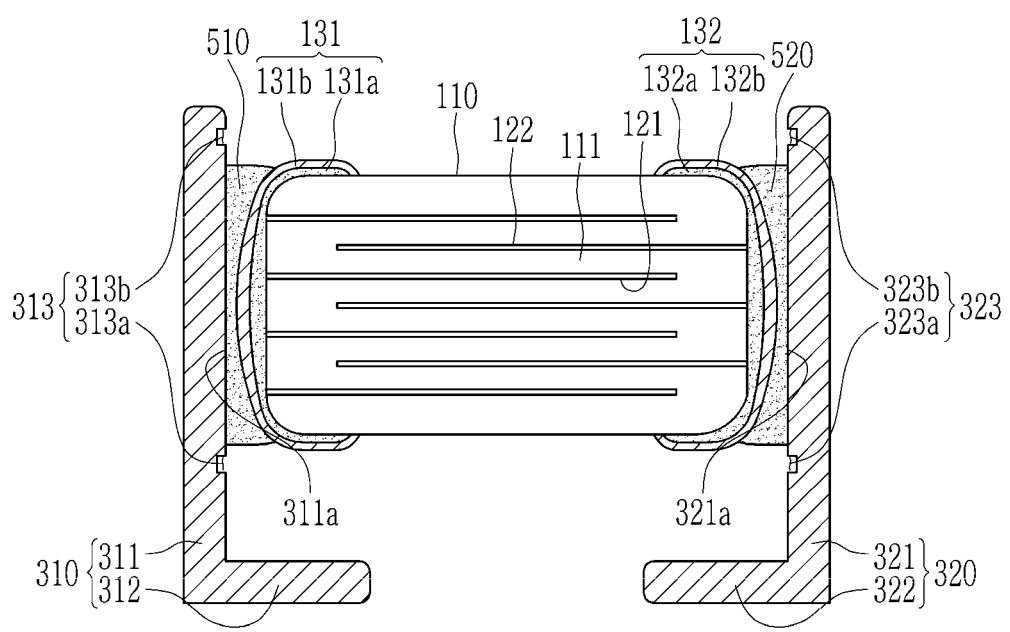
FIG. 2 is a cross-sectional view of the electronic component taken along line I-I' of FIG. 1.
Figure 2:
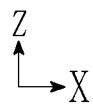
Figure 3:
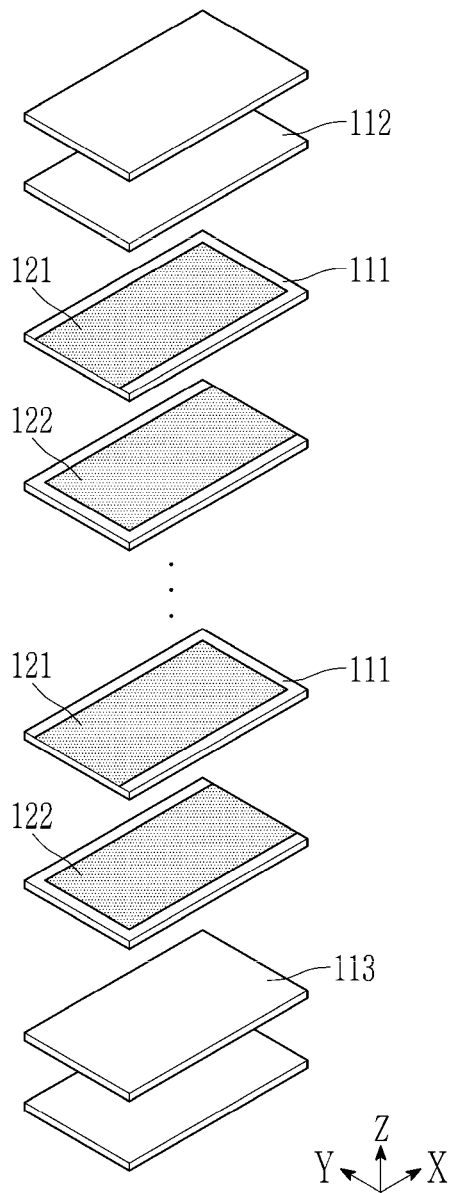
FIG. 3 is an exploded perspective view illustrating a stacked structure of internal electrodes in the multilayer capacitor of FIG. 1.
Figure 4:
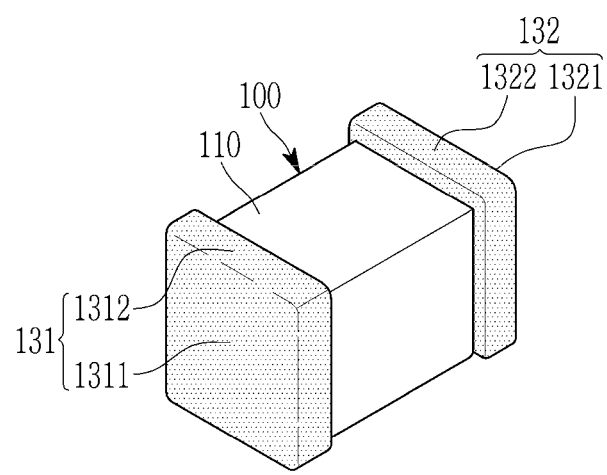
FIG. 4 is a perspective view illustrating the multilayer capacitor of FIG. 1.
Figure 5:
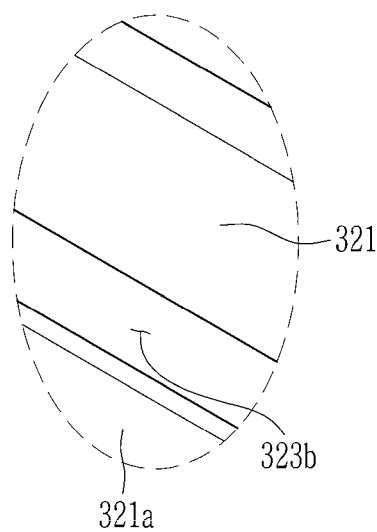
FIG. 5 is an enlarged view of the portion A of FIG. 1.

FIG. 1 is a partially exploded perspective view illustrating an electronic component according to an embodiment, FIG. 2 is a cross-sectional view of the electronic component taken along line I-I' of FIG. 1, FIG. 3 is an exploded perspective view illustrating a stacked structure of internal electrodes in the multilayer capacitor of FIG. 1, FIG. 4 is a perspective view illustrating the multilayer capacitor of FIG. 1, and FIG. 5 is an enlarged view of the portion A of FIG. 1.

In order to clearly describe the present embodiment, X, Y, and Z directions in the drawings are respectively defined as a length direction, a width direction, and a thickness direction of a capacitor body 110. Herein, the Z direction, the thickness direction, may be used in the same concept as a stacking direction in which dielectric layers 111 are stacked. The X direction may be defined as an approximately perpendicular direction to the Z direction, and the Y direction may be defined as an approximately perpendicular direction to the Z direction.

Referring to FIGS. 1 to 5, an electronic component according to the present embodiment includes a multilayer capacitor 100, first and second frame terminals 310 and 320, and first and second conductive bonding portions 510 and 520.

The multilayer capacitor 100 includes the capacitor body 110 and first and second external electrodes 131 and 132 disposed at both ends of the capacitor body 110 which face each other in the X direction.

The capacitor body 110 of the multilayer capacitor 100 is formed by stacking a plurality of the dielectric layers 111 in the Z direction and then firing them, and includes the plurality of dielectric layers 111 and a plurality of first and second internal electrodes 121 and 122 alternately interposed therebetween in the Z direction.

In addition, covers 112 and 113 may be formed at both ends of the capacitor body 110 in the Z direction.

Herein, each dielectric layer 111 adjacent to the capacitor body 110 may be integrated too closely to distinguish boundaries.

For example, this capacitor body 110 may have a substantially hexahedral shape.

In the present embodiment, for better understanding and ease of description, both surfaces of the capacitor body 110 facing each other in the Z direction are defined as first and second surfaces, both surfaces thereof facing each other in the X direction and connected to the first and second surfaces are defined as third and fourth surfaces, and both of surfaces connected to the first and second surfaces and also to the third and fourth surfaces and facing each other in the Y direction are defined as fifth and sixth surfaces. For example, the first surface, which is a bottom surface, may be a surface facing a mounting direction.

For example, the dielectric layer 111 may include a ceramic material with a high dielectric constant. For example, the ceramic material may include a dielectric material ceramic including a component such as $BaTiO_3$, $CaTiO_3$, $SrTiO_3$, $CaZrO_3$, or the like. In addition, in addition to these components, auxiliary components such as a Mn compound, an Fe compound, a Cr compound, a Co compound, a Ni compound, and the like may be further included.

For example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like in which Ca and Zr are partially dissolved in a $BaTiO_3$— based dielectric material ceramic may be included.

In addition, in the dielectric layer 111, a ceramic additive, an organic solvent, a plasticizer, a binder, a dispersing agent, and the like along with the ceramic powder may be further added. The ceramic additive may be, for example, a transition metal oxide or a transition metal carbide, a rare earth element, magnesium (Mg), aluminum (Al), or the like.

For example, the dielectric layer 111 may have an average thickness of about 0.5 μm to about 10 μm. The phrase, a parameter of "about" a value, may mean the parameter being the value, and may also mean that the parameter is within a range from the value−Δ to the value+Δ, in which Δ represents a process error or a measurement error recognizable by one of ordinary skill in the art.

The first and second internal electrodes 121 and 122 are electrodes having different polarities, and are alternately disposed to face each other in the Z direction with the dielectric layer 111 in the middle. One ends thereof may be exposed through the third and fourth surfaces of the capacitor body 110.

The first and second internal electrodes 121 and 122 may be electrically insulated by the dielectric layer 111 disposed in the middle.

The ends of the first and second internal electrodes 121 and 122 alternately exposed through (or being in contact with or extending from) the third and fourth surfaces of the capacitor body 110 may be electrically connected respectively to the first and second external electrodes 131 and 132.

The first and second internal electrodes 121 and 122 may include a conductive metal, for example, a metal such as Ni, Cu, Ag, Pd, Au, and the like or an alloy thereof, for example, an Ag—Pd alloy.

For example, the first and second internal electrodes 121 and 122 may include dielectric material particles having the same composition as the ceramic material included in the dielectric layer 111.

For example, the first and second internal electrodes 121 and 122 may have an average thickness of about 0.1 μm to about 2 μm.

According to the above configuration, when a predetermined voltage is applied to the first and second external electrodes 131 and 132, charges are accumulated between the first and second internal electrodes 121 and 122. Herein, capacitance of the multilayer capacitor 100 is proportional to an overlapped area of the first and second internal electrodes 121 and 122 overlapped along the Z direction.

The first and second external electrodes 131 and 132 may be provided with voltages having different polarities and electrically connected to the exposed portions of the first and second internal electrodes 121 and 122, respectively.

The first and second external electrodes 131 and 132 may respectively include first and second connection portions 1311 and 1321 disposed on the third and fourth surfaces of the capacitor body 110 and respectively connected to the first and second internal electrodes 121 and 122, and also first and second band portions 1312 and 1322 disposed at corners where the first and second surfaces of the capacitor body 110 meet the third and fourth surfaces thereof.

The first and second band portions 1312 and 1322 may extend from the first and second connection portions 1311 and 1321 to portions of the first and second surfaces of the capacitor body 110, respectively. The first and second band portions 1312 and 1322 respectively may further extend from the first and second connection portions 1311 and 1321 to the portions of the fifth and sixth surfaces of the capacitor body 110.

The first and second external electrodes 131 and 132 may respectively include first and second base electrodes 131a and 132a in contact with the capacitor body 110, and also first and second terminal electrodes 131b and 132b respectively covering the first and second base electrodes 131a and 132a.

The first and second base electrodes 131a and 132a may include copper (Cu). Alternatively, the first and second base electrodes 131a and 132a may include a conductive paste including copper (Cu) as a main component, one or more materials of nickel (Ni), tin (Sn), palladium (Pd), platinum (Pt), gold (Au), silver (Ag), tungsten (W), titanium (Ti), lead (Pb), or an alloy thereof, and glass.

For example, the first and second base electrodes 131a and 132a may be formed in a method of dipping the capacitor body 110 in a conductive paste including a conductive metal and glass, printing the conductive paste on the surface of the capacitor body 110 through screen printing, gravure printing, or the like, and coating the conductive paste on the surface of the capacitor body 110 or transferring a dry film formed by drying the conductive paste onto the capacitor body 110.

The first base electrode 131a and the second base electrode 132a are formed of the above conductive paste and thus may increase density of the first and second external electrodes 131 and 132 due to the glass added thereto as well as maintain sufficient conductivity, and thereby effectively suppress penetration of a plating solution and/or external moisture.

For example, the glass component included in the first base electrode 131a and the second base electrode 132a may have a composition in which oxides are mixed, and the metal oxides may be one or more selected from a silicon oxide, a boron oxide, an aluminum oxide, a transition metal oxide, an alkali metal oxide, and an alkali earth metal oxide. The transition metal may be selected from zinc (Zn), titanium (Ti), copper (Cu), vanadium (V), manganese (Mn), iron (Fe), and nickel (Ni), the alkali metal may be at least one selected from lithium (Li), sodium (Na), and potassium (K), and the alkaline earth metal may be at least one selected from magnesium (Mg), calcium (Ca), strontium (Sr), and barium (Ba).

For example, the first and second terminal electrodes 131b and 132b may include nickel (Ni) as a main component, and may further include copper (Cu), tin (Sn), palladium (Pd), platinum (Pt), gold (Au), silver (Ag), tungsten (W), titanium (Ti), or lead (Pb) alone or an alloy thereof. The first and second terminal electrodes 131b and 132b may improve mountability of the multilayer capacitor 100 on a board, structural reliability, external durability, heat resistance, and equivalent series resistance (ESR).

For example, the first and second terminal electrodes 131b and 132b may be formed through plating. The first and second terminal electrodes 131b and 132b may be formed through sputtering or electroplating (electric deposition).

The multilayer capacitor 100 may be disposed between the first and second frame terminals 310 and 320. For example, the first and second frame terminals 310 and 320 are respectively disposed outside of the first and second external electrodes 131 and 132 in the X direction.

The first frame terminal 310 includes a first supporting portion 311 extended in the Z direction and a first mounting portion 312 extended from a lower end of the first supporting portion 311 in the X direction.

The second frame terminal 320 includes a second supporting portion 321 facing the first supporting portion 311 and extended in the Z direction and a mounting portion 322 extended from a lower end of the second supporting portion 321 in the X direction.

According to this structure, the first and second frame terminals 310 and 320 may largely have an 'L' shape, and each end of the first and second frame terminals 310 and 320 may be disposed to face each other in the X direction.

The first and second frame terminals 310 and 320 include base portions made of a base material, first and second inner plating portions disposed on the surfaces of the base portion facing the first and second external electrodes 131 and 132 of the multilayer capacitor 100, and first and second outer plating portions disposed on the opposite surfaces to the first and second inner plating portions.

The base portions of the first and second frame terminals 310 and 320 may be formed of the base material including Ni, Fe, Cu, Ag, Cr, or an alloy thereof. For example, the base portions of the first and second frame terminal 310 and 320 may be an Fe-42Ni alloy or an Fe-18Cr alloy. For example, the base portions of the first and second frame terminals 310 and 320 may have an average thickness of about 0.05 mm to about 0.5 mm.

For example, the first and second inner plating portions and the first and second outer plating portions may include lower plating portions and upper plating portions.

The lower plating portions may be disposed on the base portions of the first and second frame terminals 310 and 320, and the upper plating portions may be disposed on the lower plating portions. The lower plating portions and the upper plating portions may respectively include a plurality of plating portions.

The lower plating portions may include Ni, Fe, Cu, Ag, Cr, or an alloy thereof, and the upper plating portions may include Sn, Ag, Au, or an alloy thereof. That is, a material of the lower plating portions may be different from a material of the upper plating portions. For example, when the upper plating portions include Sn or an alloy including Sn as a main component, solder wettability of the first and second frame terminals 310 and 320 may be improved and thus may be greatly different from that of first and second plating portion removal portions.

When the first and second frame terminals 310 and 320 are bonded with the multilayer capacitor 100 by a solder, the solder may be moved to the first and second inner plating portions having larger wettability and prevented from being diffused into the multilayer capacitor 100.

In addition, when the lower plating portions include Ni, Fe, Cr, or an alloy thereof having a high melting point, heat resistance of the first and second frame terminals 310 and 320 may be improved.

For example, the lower plating portions may have an average thickness of about 0.2 μm to about 5.0 μm, and the upper plating portions may have an average thickness of about 1.0 μm to about 5.0 μm.

The first and second external electrodes 131 and 132 of the multilayer capacitor 100 respectively are electrically connected to the first and second frame terminals 310 and 320. For this connection, the electronic component includes first and second conductive bonding portions 510 and 520.

The first conductive bonding portion 510 is disposed between the first external electrode 131 and the first frame terminal 310, while the second conductive bonding portion 520 is disposed between the second external electrode 132 and the second frame terminal 320.

For example, the first and second conductive bonding portions 510 and 520 may include a solder or a conductive adhesive such as a conductive resin paste and the like. For example, the solder may be Sn—Sb-based, Sn—Ag—Cu-based, Sn—Cu-based, Sn—Bi-based, or the like. The Sn—Sb-based solder may include Sb in amount of greater than or equal to about 5% and less than or equal to about 15%.

Herein, a flux component included in the solder may dissolve a glass component of the multilayer capacitor 100 and thus make a moisture penetration path and thereby deteriorate moisture resistance reliability.

In order to solve this problem, the first supporting portion 311 includes a first groove portion 313 on an outer periphery of an area in contact with the first conductive bonding portion 510, and the second supporting portion 321 includes a second groove portion 323 on an outer periphery of an area of the second conductive bonding portion 520. The first and second groove portions 313 and 323 extend at least along first direction outer peripheries of the areas in contact with the first and second conductive bonding portions 510 and 520. For example, the first direction may be the Z direction, a stacking direction in which the dielectric layers 111 are stacked. In other words, the first and second groove portions 313 and 323 are respectively disposed between the areas in contact with the first and second conductive bonding portions 510 and 520 and the first direction outer peripheries of the first and second supporting portions 311 and 321.

The first and second groove portions 313 and 323 may prevent lateral diffusion of the flux included in the solder for bonding and thus improve IR (insulation resistance) characteristics of the electronic component.

The first and second groove portions 313 and 323 are disposed on the surfaces of the first and second supporting portions 311 and 312 facing the multilayer capacitor 100. The surfaces of the first and second supporting portions 311 and 312 facing the multilayer capacitor 100 are defined as inner surfaces of the first and second supporting portions 311 and 312.

The inner surface of the first supporting portion 311 includes a first adhesive region 311a that is an area in contact with the first conductive bonding portion 510, and the inner surface of the second supporting portion 321 includes a second adhesive region 321a that is an area in contact with the second conductive bonding portion 520.

For example, the first and second adhesive regions 311a and 321a may have a substantially rectangular shape like the first and second conductive bonding portions 510 and 520 or the connection portions 1311 and 1321 of the first and second external electrodes 131 and 132, and a similar width to that of the first and second conductive bonding portions 510 and 520 or the connection portions 1311 and 1321 of the first and second external electrodes 131 and 132. In addition, the first and second adhesive regions 311a and 321a may be disposed at any height of central areas excluding inner edges of the first and second supporting portions 311 and 312.

The first groove portion 313 is disposed on the outer periphery of the first adhesive region 311a, and the second groove portion 323 is disposed on the outer periphery of the second adhesive region 321a.

Herein, the first groove portion 313 has a first partial groove portion 313a and a second partial groove portion (not shown) extending in different directions along the outer periphery of the first adhesive region 311a, and the second groove portion 323 has a first partial groove portion 323a and a second partial groove portion 323c extending in different directions along the outer periphery of the second adhesive region 321a. For example, the different directions may be the Y direction and the Z direction, and the first partial groove portions 313a and 323a may extend in the Y direction and the second partial groove portion 323c may extend in the Y direction.

For example, the first groove portion 313 may be disposed at an upper side, a lower side, a left side, a right side, or a combination thereof of the first adhesive region 311a, respectively, and the second groove portion 323 may be disposed at an upper side, a lower side, a left side, a right side, or a combination thereof of the second adhesive region 321a, respectively.

Herein, upper and lower sides of the first and second adhesive regions 311a and 321a may be defined upward and downward in the Z direction, and right and left sides of the first and second adhesive regions 311a and 321a may be defined as both sides in the Y direction.

For example, the first groove portion 313 may include the first partial groove portion 313a and the third partial groove portion 313b extended in the Y direction on the surface of the first frame terminal 310 facing the multilayer capacitor 100 and the second partial groove portion (not shown) and the fourth partial groove portion (not shown) extended in the Z direction, and the second groove portion 323 may include the first partial groove portion 323a and the third partial groove portion 323b extended in the Y direction on the surface of the second frame terminal 320 facing the multilayer capacitor 100 and the second partial groove portion 323c and the fourth partial groove portion 323d extended in the Z direction.

Accordingly, the first groove portion 313 may surround the outer periphery of the first adhesive region 311a, and the second groove portion 323 may surround the outer periphery of the second adhesive region 321a.

The first groove portion 313 may have a closed circuit shape in which one end is connected to the other end, and the second groove portion 323 also may have a closed circuit shape in which one end is connected to the other end. For example, one ends of the first partial groove portions 313a and 323a are connected to one end of the second partial groove portion 323c, the other end of the second partial groove portion 323c is connected to one ends of the third partial groove portions 313b and 323b, the other ends of the third partial groove portions 313b and 323b are connected to one end of the fourth partial groove portion 323d, and the other end of the fourth partial groove portion 323d is connected to the other ends of the first partial groove portions 313a and 323a.

In addition, the first groove portion 313 may be disposed only between the outer periphery of the first adhesive region 311a and the edge of the first supporting portion 311 but not extended to the edge of the first supporting portion 311. Similarly, the second groove portion 323 may be disposed only between the outer periphery of the second adhesive region 321a and the edge of the second supporting portion 321 but not extended to the edge of the second supporting portion 321.

Accordingly, the first groove portion 313 may surround the outer periphery of the first adhesive region 311a as a completely closed circuit shape, and the second groove portion 323 also may surround the outer periphery of the second adhesive region 321a as a completely closed circuit shape. When the first and second groove portions 313 and 323 respectively surround the outer peripheries of the first and second adhesive regions 311a and 321a as a completely closed circuit shape, excellent effects of preventing the diffusion of the solder flux may be obtained, and in addition, when mounted on a board, penetration of the solder flux from the outside may be prevented.

The first and second groove portions 313 and 323 may have a concave and long-grooved line shape. For example, the first and second groove portions 313 and 323 may have a shape with a deeper depth than a width. Herein, when the first and second groove portions 313 and 323 have a width extended in the Y direction of the first and second groove portions 313 and 323, the Z direction is a length, when extended in the Z direction, the Y direction is a length, while the first and second groove portions 313 and 323 have a depth in the X direction.

For example, each one side of the first and second groove portions 313 and 323 may be longer than or equal to or longer than each one side of the first and second external electrodes 131 and 132. In other words, lengths of the first partial groove portions 313a and 323a, the second partial groove portion 323c, the third partial groove portions 313b and 323b, and the fourth partial groove portion 323d may be respectively greater than or equal to that of one side of the first and second connection portions 1311 and 1321.

Herein, the length of each one side of the first and second connection portions 1311 and 1321 indicates a length of each one side on a Y-Z plane, for example, the length of each one side of the first and second connection portions 1311 and 1321 corresponding to the length of each one side of the first partial groove portions 313a and 323a and the third partial groove portions 313b and 323b may be a Y direction length, and a length of each one side of the first and second connection portions 1311 and 1321 corresponding to the second partial groove portion 323c and the fourth partial groove portion 323d is a Z direction length.

Accordingly, an inner area of the first and second groove portions 313 and 323 including the first partial groove portions 313a and 323a, the second partial groove portion 323c, the third partial groove portions 313b and 323b, and the fourth partial groove portion 323d may be larger than an area of the Y-Z direction plane of the first and second connection portions 1311 and 1321, and the first and second groove portions 313 and 323 respectively may surround the first and second connection portions 1311 and 1321 as a completely closed circuit shape.

When the inner area of the first and second groove portions 313 and 323 is smaller than that of the first and second connection portions 1311 and 1321, a size of the first and second adhesive regions 311a and 321a is reduced, which may deteriorate a bonding force of the first and second frame terminals 310 and 320 with the multilayer capacitor 100 and thereby structural durability.

For example, when the multilayer capacitor 100 has a size of about 3.2 mm (X direction)*about 2.5 mm (Y direction) *about 2.5 mm (Z direction), the Y-Z plane shape of the first and second connection portions 1311 and 1321 is a square with one side length of about 2.5 mm, wherein the first partial groove portions 313a and 323a, the second partial groove portion 323c, the third partial groove portions 313b and 323b, and the fourth partial groove portion 323d have one side length of greater than or equal to about 2.5 mm.

For example, when the multilayer capacitor 100 has a size of about 3.2 mm (X direction)*about 2.5 mm (Y direction) *about 2.0 mm (Z direction), the Y-Z plane shape of the first and second connection portions 1311 and 1321 is a rectangle with one side width of about 2.5 mm and one side length of about 2.0 mm, wherein the first partial groove portions 313a and 323a and the third partial groove portions 313b and 323b may have a length of greater than or equal to about 2.5 mm, while the second partial groove portion 323c and the fourth partial groove portion 323d may have a length of greater than or equal to about 2.0 mm.

For example, the first and second groove portions 313 and 323 may have an average width ratio of less than or equal to about 50%, for example, about 1% to about 50%, about 10% to about 40%, or about 20% to about 30% based on an average thickness ratio of the first and second frame terminals 310 and 320. Herein, the thickness of the first and second frame terminals 310 and 320 is the X direction thickness of the first and second supporting portions 311 and 321, and for example, the average width ratio of the first and second groove portions 313 and 323 may be calculated by dividing an average width of the first and second groove portions 313 and 323 by an average thickness of the first frame and second frame terminals 310 and 320 and then multiplying by 100. When the first and second groove portions 313 and 323 have an average width ratio of greater than about 50%, structural durability of the first and second frame terminals 310 and 320 may be deteriorated. Herein, the average width of the first and second groove portions 313 and 323 may be an arithmetic mean of widths thereof, which are measured at any 3, 5, or 10 points, when the first and second groove portions 313 and 323 are extended along the Y direction, and the average thickness of the first and second frame terminals 310 and 320 may be an arithmetic mean of thicknesses thereof, which are measured at any 3, 5, or 10 points disposed at a predetermined interval along the Y direction and/or the Z direction.

For example, an average depth ratio of the first and second groove portions 313 and 323 may be about 50% or less, for example, about 1% to about 50%, about 10% to about 40%, or about 20% to about 30% relative to an average thickness of the first and second frame terminals 310 and 320. Herein, the average thickness of the first and second frame terminals 310 and 320 may be an X direction thickness of first and second supporting portions 311 and 321, and for example, the average width ratio of the first and second groove portions 313 and 323 may be obtained by dividing the average depth of the first and second groove portions 313 and 323 by the average thickness of the first and second frame terminals 310 and 320 and then multiplying by 100. Herein, the average depth of the first and second groove portions 313 and 323 may be, for example, when the first and second groove portions 313 and 323 are extended along the Y direction, an arithmetic mean of depths measured at any 3, 5, or 10 points disposed at a predetermined interval along the Y direction, and the average thickness of the first and second frame terminals 310 and 320 may be an arithmetic mean of thicknesses measured at any 3, 5, or 10 points at a predetermined interval along the Y direction and/or Z direction. In one example, an optical microscope or a scanning electron microscope (SEM) may be used to measure an average thickness, an average width, and an average depth. The present disclosure is not limited thereto. Other measurement methods or tools recognized by one of ordinary skill in the art may also be used.

When the average depth ratio of the first and second groove portions 313 and 323 is greater than about 50%, structural durability of the first and second frame terminals 310 and 320 may be deteriorated.

When the first and second groove portions 313 and 323 have a concave and long grooved line shape, the effect of confining the solder flux inside the first and second groove portions 313 and 323 may be much more excellent, and the solder flux may be directed toward a desired direction along the first and second groove portions 313 and 323.

For example, the first and second groove portions 313 and 323 are each formed by removing a portion of the smooth surfaces of the base portions of the first and second frame terminals 310 and 320, or when the first and second frame terminals 310 and 320 respectively include the first and second inner plating portions, the first and second groove portions 313 and 323 may be the lower plating portions exposed by removing the upper plating portions of the first and second inner plating portions or the base portions exposed by removing the upper plating portion and the lower plating portion.

For example, a method of removing the base portions of the first and second frame terminals 310 and 320 or the first and second inner plating portions may be a mechanical process such as cutting or polishing, a process of laser trimming, a chemical process of etching such as with sodium hydroxide, and the like, or a method of applying a resist on portions for forming the first and second groove portions 313 and 323 in the first and second frame terminals 310 and 320 and then removing it after forming the first and second inner plating portions may be used.

Figure 6:
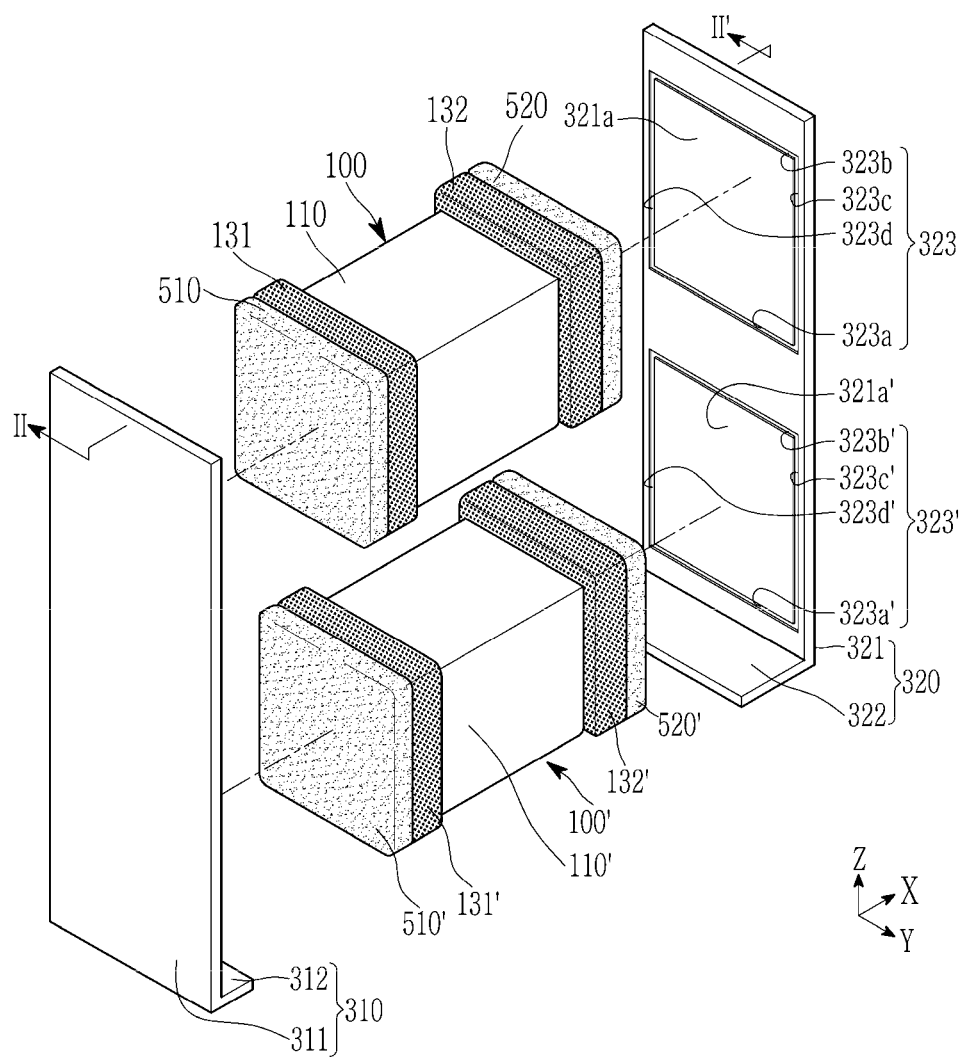
FIG. 6 is a partially exploded perspective view illustrating an electronic component according to another embodiment.
Figure 7:
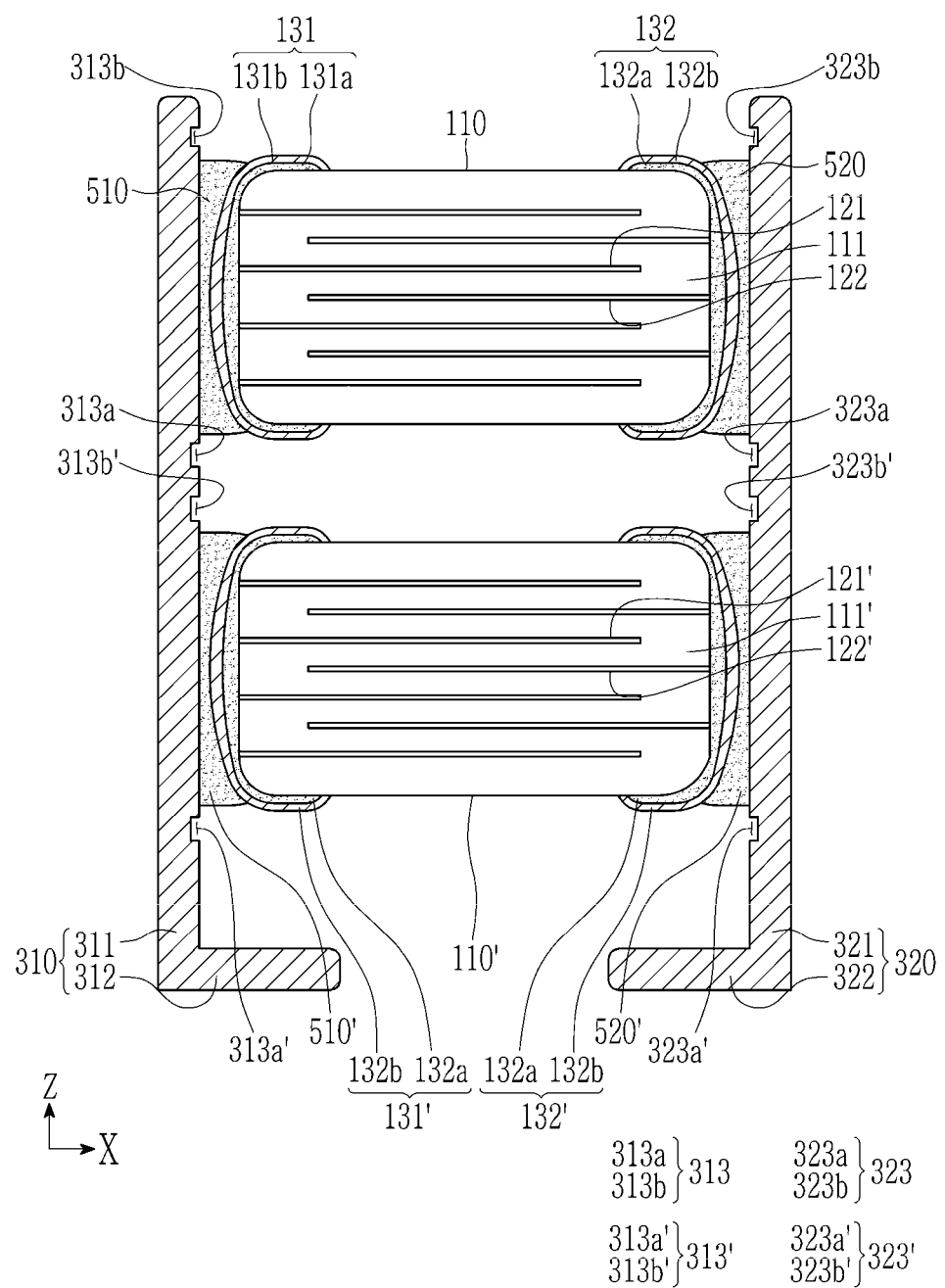
FIG. 7 is a cross-sectional view of the electronic component taken along line II-II' of FIG. 6.

FIG. 6 is a partially exploded perspective view illustrating an electronic component according to another embodiment, and FIG. 7 is a cross-sectional view of the electronic component taken along line II-II' of FIG. 6.

Since the electronic component according to the present embodiment is similar to the aforementioned electronic component, overlapping descriptions are omitted, and differences are mainly described. For example, the description of A', in which A is a reference character shown in FIGS. 1 and 2, may be the same as the description of A. Thus, overlapping descriptions are omitted.

FIGS. 1 and 2 illustrate a case in which one multilayer capacitor 100 is included, whereas FIGS. 6 and 7 illustrate a case in which a plurality of multilayer capacitors 100 and 100' are included.

For example, the first and second multilayer capacitors 100 and 100' may be arranged in the Z direction. In this case, the first surface of the first multilayer capacitor 100 and the second surface of the second multilayer capacitor 100' may be disposed to face each other.

Alternatively, the first and second multilayer capacitors 100 and 100' may be disposed in a row in the X direction or in parallel in the Y direction. According to another example, three or more multilayer capacitors may be stacked in the Z direction.

The first multilayer capacitor 100 and the second multilayer capacitor 100' may be disposed to be spaced apart from each other at a predetermined interval. For example, the interval between the first multilayer capacitor 100 and the second multilayer capacitor 100' may be about 0.1 mm to about 1.0 mm in the Z direction.

The multilayer capacitor 100' disposed at the lowest bottom in the Z direction may be disposed at a predetermined distance apart in the Z direction from the first and second mounting portions 312 and 322 of the first and second frame terminals 310 and 320.

The first and second multilayer capacitors 100 and 100' are disposed between the first and second frame terminals 310 and 320.

Accordingly, the electronic component includes a plurality of the first conductive bonding portions 510 and 510' and the second conductive bonding portions 520 and 520' respectively disposed between the first and second multilayer capacitors 100 and 100' and the first and second frame terminals 310 and 320.

The plurality of the first conductive bonding portions 510 and 510' and the second conductive bonding portions 520 and 520' may also be arranged in the Z direction at positions corresponding to the first and second multilayer capacitors 100 and 100' or disposed at regular intervals to one another.

The first supporting portion 311 includes the first groove portions 313 and 313' on the outer peripheries of the areas in contact with first conductive bonding portions 510 and 510', and the second supporting portion 321 includes the second groove portions 323 and 323' on outer peripheries of the areas in contact with the second conductive bonding portions 520 and 520'. The first groove portions 313 and 313' and the second groove portions 323 and 323' are respectively extended at least along the first direction outer peripheries of the areas in contact with the first and second conductive bonding portions 510, 510', 520, and 520'. For example, the first direction may be the Z direction, which is a stacking direction in which the dielectric layers 111 are stacked. In other words, the first groove portions 313 and 313' and the second groove portions 323 and 323' are respectively disposed between the areas in contact with the first and second conductive bonding portions 510, 510', 520, and 520' and the first direction edges of the first and second supporting portions 311 and 321.

For example, the first groove portions 313 and 313' and the second groove portions 323 and 323' may be disposed at regular intervals from each other in the Z direction at positions corresponding to the first conductive bonding portions 510 and 510' and the second conductive bonding portions 520 and 520'.

The first groove portions 313 and 313' and the second groove portions 323 and 323' are respectively disposed on the surfaces of the first and second supporting portions 311 and 312 facing the first and second multilayer capacitors 100 and 100'. The surfaces of the first and second supporting portions 311 and 312 facing the first and second multilayer capacitors 100 and 100' may be defined as inner surfaces of the first and second supporting portions 311 and 312.

The inner surface of the first supporting portion 311 includes the first adhesive regions 311a, which are areas in contact with the first conductive bonding portions 510 and 510', and the inner surface of the second supporting portion 321 includes second adhesive regions 321a and 321a', which are areas in contact with the second conductive bonding portions 520 and 520'.

The first groove portions 313 and 313' are disposed on the outer periphery of the first adhesive regions 311a and the second groove portions 323 and 323' are disposed on the outer periphery of the second adhesive regions 321a and 321a'.

The first groove portions 313 and 313' respectively have the first partial groove portions 313a and 313a' extended in each different direction along the outer periphery of the first adhesive regions 311a and second partial groove portions (not shown), and the second groove portions 323 and 323' respectively have first partial groove portions 323a and 323a' extended in each different direction along the outer peripheries of the second adhesive regions 321a and 321a' and second partial groove portions 323c and 323c'. For example, the different directions may be the Y direction and the Z direction, and the first partial groove portions 313a, 313a', 323a, and 323a' may be extended in the Y direction, while the second partial groove portions 323c and 323c' may be extended in the Z direction.

Figure 8A:
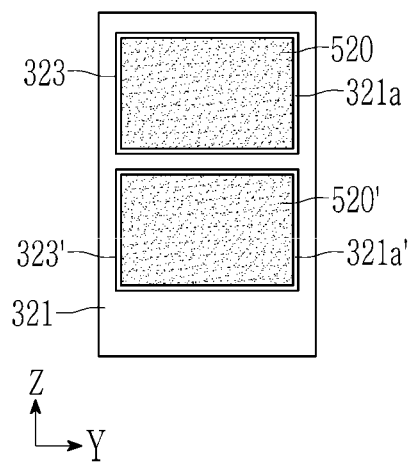
FIGS. 8A and 8B are views respectively illustrating various shapes of the second groove portions of FIG. 6.
Figure 8B:
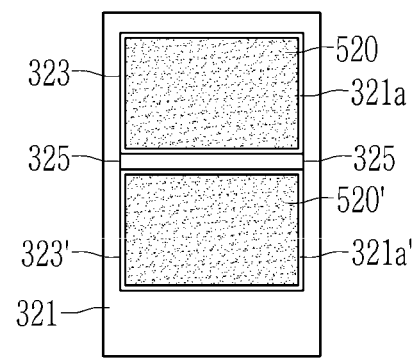

FIGS. 8A and 8B are views respectively illustrating various shapes of the second groove portions 323 and 323' of FIG. 6. FIGS. 8A and 8B are views of the second supporting portion 321 viewed from the X direction in FIG. 6. The first groove portions 313 and 313' may also have various shapes like the second groove portions 323 and 323' illustrated in FIGS. 8A and 8B.

As shown in FIG. 8A, when the electronic component includes a plurality of the second conductive bonding portions 520 and 520', the second supporting portion 321 includes a plurality of the second adhesive regions 321a and 321a' respectively in contact with the second conductive bonding portions 520 and 520', a plurality of the first partial groove portions 323a and 323a' respectively extended along the outer peripheries of the plurality of the second adhesive regions 321a and 321a', the second partial groove portions 323c and 323c', the third partial groove portions 323b and 323b', and the fourth partial groove portions 323d and 323d'.

Herein, the first partial groove portions 323a and 323a' or the third partial groove portions 323b and 323b' and the second partial groove portions 323c and 323c' or the fourth partial groove portions 323d and 323d' are extended in each different direction. For example, the different directions may be the Y direction and the Z direction, and the first partial groove portions 323a and 323a' or the third partial groove portions 323b and 323b' may be extended in the Y direction, while the second partial groove portions 323c and 323c' or the fourth partial groove portions 323d and 323d' may be extended in the Z direction.

As shown in FIG. 8B, when the second supporting portion 321 includes the plurality of second groove portions 323 and 323', the second supporting portion 321 may further include a fifth partial groove portion 325 connecting a plurality of second groove portions 323 and 323' with each other.

The fifth partial groove portion 325 may have the same concave and long grooved line shape as the second groove portions 323 and 323'.

The fifth partial groove portion 325 is extended in the Z direction on the surface of the second frame terminal 320 facing the multilayer capacitors 100 and 100' and may connect the second partial groove portions 323c and 323c' of the plurality of second groove portions 323 and 323' or the fourth partial groove portions 323d and 323d' with each other.

Hereinafter, specific examples are presented. However, the examples described below are only for specifically illustrating or explaining the invention, and the scope of the invention is not limited thereto.

Experimental Example: Performance Test of Electronic Components

As shown in FIG. 6, an electronic component of Example 1 was manufactured by including two multilayer capacitors (L×W×T=3.2 mm×2.5 mm×2.5 mm) and forming a plurality of first and second groove portions extended along each outer periphery of a plurality of first and second adhesive regions in first and second supporting portions.

In FIG. 6, the electronic component of Comparative Example 1 was manufactured to have no first and second groove portions on the surfaces of the first and second frame terminals.

The electronic components according to Example 1 and Comparative Example 1 were subjected to a flux residue check and a moisture load resistance test, and the results are shown in Table 1. The size of the multilayer capacitor used was L×W×T=3.2 mm×2.5 mm×2.5 mm, and the quantity was 20 for each.

In order to check the presence of flux residue, the presence or absence of flux residue under the multilayer capacitor was observed with a digital microscope for each sample. The sample was erected and observed in a direction orthogonal to the side surfaces of the first and second multilayer capacitors. Herein, a light source was placed at 180° opposite to the observation side. A sample of which a flux seeped out more on the inside than portions where the external electrode of the first and second multilayer capacitors extended toward the main surface or side surface from the cross-section was evaluated as NG.

The moisture load resistance test was performed by applying a rated voltage of 120% of a DC voltage to the first and second multilayer capacitors at 85° C. under humidity of 85% to measure IR, and a sample of which IR after 2000 hours was 30% or less (0.5 digit with log) of the initial IR was determined as NG.

TABLE 1

|  | Comparative Example 1 | Example 1 |
| --- | --- | --- |
| Flux residue (count) | 9/20 | 0/20 |
| Moisture load (count) | 6/20 | 0/20 |

Referring to Table 1, in the electronic component of Example 1, compared with the electronic component of Comparative Example 1, a flux included in a solder after soldering a multilayer capacitor to a frame terminal was constrained in the first and second groove portions and thus exhibited reduced diffusion toward the multilayer capacitor direction, thereby reducing deterioration of IR.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. An electronic component, comprising:
a multilayer capacitor including a capacitor body including a dielectric layer and an internal electrode, and an external electrode disposed on one surface of the capacitor body;
a frame terminal disposed on the external electrode; and
a conductive bonding portion disposed between the external electrode and the frame terminal,
wherein the frame terminal has a groove portion extending along an outer periphery of an area in contact with the conductive bonding portion, and
the groove portion is spaced apart from an edge of the frame terminal and does not penetrate through the frame terminal.

2. The electronic component of claim 1, wherein the groove portion is disposed on a surface of the frame terminal facing the multilayer capacitor.

3. The electronic component of claim 1, wherein the groove portion includes a first partial groove portion extending in a first direction, and a second partial groove portion extending in a second direction different from the first direction.

4. The electronic component of claim 3, wherein
the groove portion further includes third and fourth partial groove portions,
wherein the third partial groove portion extends in the first direction, and
the fourth partial groove portion extends in the second direction.

5. The electronic component of claim 3, wherein each length of the first and second partial groove portions is greater than or equal to a length of one side of the corresponding external electrode, respectively.

6. The electronic component of claim 1, wherein the groove portion surrounds the outer periphery of the area in contact with the conductive bonding portion.

7. The electronic component of claim 1, wherein the groove portion is disposed between the outer periphery of the area in contact with the conductive bonding portion and an edge of the frame terminal.

8. The electronic component of claim 1, wherein the groove portion has a closed circuit shape in which one end and the other end are connected to each other.

9. The electronic component of claim 1, wherein the groove portion has a concave and long-grooved line shape.

10. The electronic component of claim 1, wherein an average width ratio of the groove portion is less than or equal to about 50% relative to an average thickness of the frame terminal.

11. The electronic component of claim 1, wherein an average depth ratio of the groove portion is less than or equal to about 50% relative to an average thickness of the frame terminal.

12. The electronic component of claim 1, wherein
the frame terminal includes a base portion and a plating portion disposed on the surface of the base portion, and
the groove portion penetrates in the plating portion.

13. The electronic component of claim 12, wherein the plating portion includes Sn or an alloy including Sn as a main component.

14. An electronic component, comprising:
first and second multilayer capacitors each including a capacitor body including a dielectric layer and an internal electrode, and an external electrode disposed on one surface of the capacitor body;
a frame terminal disposed on the external electrodes; and
conductive bonding portions disposed between the external electrodes and the frame terminal,
wherein the frame terminal has one groove portion extending along an outer periphery of an area in contact with the conductive bonding portion facing the external electrode of the first multilayer capacitor and another groove portion extending along an outer periphery of an area in contact with the conductive bonding portion facing the external electrode of the second multilayer capacitor, and
the one groove portion and the another groove portion are spaced apart from an edge of the frame terminal and does not penetrate through the frame terminal.

15. The electronic component of claim 14, wherein
the one groove portion includes a first partial groove portion extending in a first direction, and a second partial groove portion extending in a second direction different from the first direction.

16. The electronic component of claim 15, wherein
the one groove portion further includes third and fourth partial groove portions,
wherein the third partial groove portion extends in the first direction, and
the fourth partial groove portion extends in the second direction.

17. The electronic component of claim 14, wherein the one groove portion surrounds the outer periphery of the area in contact with the conductive bonding portion facing the external electrode of the first multilayer capacitor.

18. The electronic component of claim 14, wherein the frame terminal further includes a fifth partial groove portion for connecting the one groove portion and the another groove portion to each other.

19. The electronic component of claim 18, wherein the fifth partial groove portion extends, in a direction from the first multilayer capacitor to the second multilayer capacitor, on a surface of the frame terminal facing the first and second multilayer capacitors.

* * * * *